US007006526B1

(12) United States Patent
Biederman

(10) Patent No.: US 7,006,526 B1
(45) Date of Patent: Feb. 28, 2006

(54) MECHANISMS FOR AVOIDING PROBLEMS ASSOCIATED WITH NETWORK ADDRESS PROTOCOL TRANSLATION

(75) Inventor: Daniel C. Biederman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 948 days.

(21) Appl. No.: 09/920,533

(22) Filed: Jul. 31, 2001

(51) Int. Cl.
*H04J 3/16* (2006.01)
*H04L 12/26* (2006.01)
*H04Q 7/20* (2006.01)

(52) U.S. Cl. ............... 370/466; 370/252; 370/392; 370/389; 370/236; 455/432.2

(58) Field of Classification Search ............... 370/466, 370/392, 236, 252, 389; 455/432.2
See application file for complete search history.

(56) References Cited

U.S. PATENT DOCUMENTS 5,815,516 A 9/1998 Aaker et al. ............... 371/53

(Continued)

OTHER PUBLICATIONS

S. Deering and R. Hinden, "Internet Protocol, Version 6 (Ipv6) Specification", Copyright © The Internet Society (1998). All rights reserved.

(Continued)

*Primary Examiner*—Ricky Ngo
*Assistant Examiner*—Feben Haile
(74) *Attorney, Agent, or Firm*—Beyer Weaver & Thomas, LLP

(57) ABSTRACT

Disclosed are methods and apparatus for avoiding problems caused by converting between two different protocols, such as IPv4 and IPv6. These problems may include, but are not limited to, fragmentation of packets, dropping of packets, and retransmission of packets. Avoiding these problems will reduce the incidence of transmission delays, bandwidth degradation, and additional processing in the packet's transmission path due to such problems. In general terms, the present invention provides mechanisms for modifying a protocol parameter, such as a TCP or UDP parameter, to avoid problems associated with protocol translation, such as fragmentation. In one implementation, the protocol parameter limits the size of a particular portion of the a packet transmitted by a sending computer node or device. For example, a packet size indicator is communicated to the sending computer node so that the sending computer node sends packets limited by the packet size indicator to thereby avoid associated with the size of such packets. In specific TCP embodiments, the size indicator specifies a window size and/or a maximum segment size. For example, if packets transmitted by a sending node to a receiving node are converted from IPv4 to IPv6 and the window size indicated to the sending node (e.g., by the receiving node) is 512 bytes, the window size is adjusted to 500 bytes before reaching the sending node. The adjustment amount may be based on an estimated size increase resulting from converting from IPv4 to IPv6. In this example, the window size is decreased by 12 bytes since a conversion from IPv4 to IPv6 where one 4 byte IPv4 address is changed to a 16 byte Ipv6 address has an associated size difference of 12 bytes. In a specific embodiment, actual changes in packet size may tracked and the adjusted size indicator may be dynamically based on such tracked changes. In other embodiments, the changes in packet size are predicted, and the adjusted size is preemptively changed as needed.

38 Claims, 5 Drawing Sheets

U.S. PATENT DOCUMENTS

| | | | | |
|---|---|---|---|---|
| 5,937,169 | A | | 8/1999 | Connery et al. ......... 395/200.8 |
| 6,038,216 | A | | 3/2000 | Packer ....................... 370/231 |
| 6,049,833 | A | | 4/2000 | Chan et al. ................. 709/237 |
| 6,076,113 | A | | 6/2000 | Ramanathan et al. ....... 709/235 |
| 6,618,393 | B1 | * | 9/2003 | Chiles et al. ............... 370/466 |
| 6,690,669 | B1 | * | 2/2004 | Tsuchiya et al. ............ 370/392 |
| 2002/0080721 | A1 | * | 6/2002 | Tobagi et al. ............... 370/236 |
| 2003/0185236 | A1 | * | 10/2003 | Asano et al. ............... 370/469 |
| 2004/0133692 | A1 | * | 7/2004 | Blanchet et al. ............ 709/230 |
| 2004/0162909 | A1 | * | 8/2004 | Choe et al. ................. 709/230 |
| 2004/0165602 | A1 | * | 8/2004 | Park et al. .................. 370/401 |
| 2004/0190549 | A1 | * | 9/2004 | Huitema .................... 370/466 |
| 2005/0002417 | A1 | * | 1/2005 | Kelly et al. ................. 370/466 |
| 2005/0025157 | A1 | * | 2/2005 | Pennec et al. ........... 370/395.5 |
| 2005/0078704 | A1 | * | 4/2005 | Anderson et al. ........... 370/466 |

OTHER PUBLICATIONS

G Tsirtsis and P. Srisuresh, "Network Address Translation-Protocol Translation (NAT-PT)" Copyright ( C ) The Internet Society ( February 2000). All rights reserved.

K. Egevang and P. Francis, "The IP Network Address Translator (NAT)", May 1994.

S. Deering, et al. "Internet Protocol, Version 6 (IPv6) Specification", Dec. 1998, The Internet Society. RFC 2460. pp. 1-32.

K. Yamamoto, et al. "Overview of Transition Techniques for IPv6-only Communication", Mar. 2000. The Internet Society. pp. 1-8.

Cheriton, et al., "Integrated Switch and Web Cache as a Layer 7 Switch", U.S. Appl. No. 09/571,090, filed on May 15, 2000. 34 pages.

* cited by examiner

MECHANISMS FOR AVOIDING PROBLEMS ASSOCIATED WITH NETWORK ADDRESS PROTOCOL TRANSLATION

BACKGROUND OF THE INVENTION

The present invention relates to methods and apparatus for processing data within a computer network. More specifically, this invention relates to mechanisms for performing network address translation on data.

For a particular computer to communicate with other computers or web servers within a network (e.g., the Internet), the particular computer must have a unique IP address. IP protocol version 4 specifies 32 bits for the IP address, which theoretically gives about 4,294,967,296 unique IP addresses. However, there are actually only between 3.2 and 3.3 billion available IP addresses since the addresses are separated into classes and set aside for multicasting, testing and other special uses. With the explosion of the Internet, the number of IP address is not enough to give each computer a unique IP address.

One solution for addressing computers with the limited number of IP addresses is referred to as network address translation (NAT). NAT allows an intermediary device (e.g., computer, router or switch) located between the Internet network and a local network to serve as an agent for a group of local computers. A small range of IP addresses or a single IP address is assigned to represent the group of local computers. Each computer within the local group is also given a local IP address that is only used within that local group. However, the group's local IP addresses may duplicate of IP address that are used outside of the local network. When a local computer attempts to communicate with a computer outside the local network, the intermediary device matches the local computer's local IP address (and port) to one of the intermediary device's assigned IP addresses (and ports). The intermediary device than replaces the local computer's local address (and port) with the matched assigned IP address (and port). This matched assigned IP address (and port) is then used to communicate between the local computer and the outside computer. Thus, NAT techniques allow IP address to be duplicated across local networks.

Another solution to the lack of available IP addresses is to redesign the address format to allow for more possible IP addresses. The recent introduction of IPv6 provides 128 bits for the IP address, as compared with IPv4 which provides 32 bits for the IP address. However, until all network devices and computers are converted to IPv6, it is still necessary to allow an existing IPv4 device to communicate with an IPv6 device. One popular method that allows IPv4 to IPv6 communication is referred to as protocol translation (NAT-PT). The IP addresses are converted by NAT-PT from one protocol to another protocol (e.g., IPv4 to IPv6 or vice versa) or from an external protocol to an internal protocol (e.g., IPv4 to IPv4). These address are typically within the packet's IP header. Additionally, there are applications above the IP layer (e.g., the transport TCP layer) that may contain IP address information. This information may include, for example, an FTP address or an HTTP address. In addition to the IP addresses, the NAT-PT also converts any relevant IPv4 or IPv6 information during a protocol translation.

When converting from IPv4 to IPv6, a conventional NAT-PT conversion increases the size of a packet since the IP address (and possibly other upper layer IP address information) is changed to a larger sized address. Additionally, since the IP address may form part of the payload of a packet (e.g., upper layer IP information), the packet's payload may increase after the conversion from IPv4 to IPv6. If the packet size is increased, the packet may then have to be dropped or fragmented to meet network packet size requirements. Thus, a server may receive two packet fragments: one packet with most of the information and one packet with just a few bytes that result from the larger address added in the NAT process.

Unfortunately, fragments require more processing than whole packets. When small fragments are formed and sent by a router within a computer network, the router TCP software allocates buffer space, forms a fragment header, and computes a checksum for each fragment. Additionally, router IP software encapsulates the fragment in a datagram, computes a header checksum, and routes the datagram to the receiver software. The server IP software verifies the IP header checksum, and passes the fragment to TCP software which then verifies the fragment checksum, examines the sequence number, extracts the data, and places it within a buffer. Additionally, fragmentation introduces delays in communication and increases packet congestion within the network.

Accordingly, there is a need for mechanisms for avoiding problems with packets, such as fragmentation, caused by being converted between IPv6 and IPv4, as well as between other types of protocols.

SUMMARY OF THE INVENTION

Accordingly, the present invention provides methods and apparatus for avoiding problems caused by converting between two different protocols, such as IPv4 and IPv6. These problems may include, but are not limited to, fragmentation of packets, dropping of packets, and retransmission of packets. Avoiding these problems will reduce the incidence of transmission delays, bandwidth degradation, and additional processing in the packet's transmission path due to such problems. In general terms, the present invention provides mechanisms for modifying a protocol parameter, such as a TCP or UDP parameter, to avoid problems associated with protocol translation, such as fragmentation. In one implementation, the protocol parameter limits the size of a particular portion of the a packet transmitted by a sending computer node or device. For example, a packet size indicator is communicated to the sending computer node so that the sending computer node sends packets limited by the packet size indicator to thereby avoid problems associated with the size of such packets.

In specific TCP embodiments, the size indicator specifies a window size and/or a maximum segment size. For example, if packets transmitted by a sending node to a receiving node are converted from IPv4 to IPv6 and the window size indicated to the sending node (e.g., by the receiving node) is 512 bytes, the window size is adjusted to 500 bytes before reaching the sending node. The adjustment amount may be based on an estimated size increase resulting from converting a packet from IPv4 to IPv6. In this example, the window size is decreased by 12 bytes since a conversion from IPv4 to IPv6 where one 4 byte IPv4 address is changed to a 16 byte Ipv6 address has an associated size difference of 12 bytes. Conversely, if a packet is converted from IPv6 to IPv4, the window size indicated to the sending node may be increased by 12 bytes. However, if there is no IPv6 to IPv4 address conversion and the packet is the maximum size, the packet could get fragmented or dropped. Thus, the window size should only be increased when a conversion is certain to occur. In a specific embodiment, actual changes in packet size may be tracked and the adjusted size indicator may be dynamically adjusted based on such tracked changes. In other embodiments, the changes in packet size are predicted, and the adjusted size is preemptively changed as needed.

In one embodiment, a method for avoiding problems associated with protocol translation is disclosed. Information related to converting data from a first protocol to a second protocol is first determined. A protocol parameter of a first data is modified based on the determined information to thereby avoid problems associated with a second data sent after the first data. Problems may result from converting the second data from the first to the second protocol. In a preferred implementation, the first protocol is IPv4 and the second protocol is IPv6, and the protocol parameter indicates a limit to a size of the second data and the problems associated with the protocol translation are based on the size of the second data. In more specific implementations, the protocol parameter is either a window size or a maximum segment size. In one aspect, the maximum segment size is advertised by a sending device of the first data and the advertised maximum segment size is modified before it reaches its final destination.

In another embodiment, the protocol parameter is decreased based on the determined information and the determined information is an estimated size increase of the second data resulting from converting the second data from the first to the second protocol. In a specific aspect, determining the information is accomplished by tracking size changes of data converted from the first to the second protocol and by estimating a sizes change in data resulting from tunneling from the first to the second protocol. In a further aspect, the first data is converted from the first to the second protocol and the second data from the second to the first protocol.

In another embodiment, the invention pertains to a computer system operable to avoid avoiding problems associated with protocol translation. The computer system includes one or more processors and one or more memory. At least one of the memory and processors are adapted to provide at least some of the above described method operations. In yet a further embodiment, the invention pertains to a computer program product for avoiding problems associated with protocol translation. The computer program product has at least one computer readable medium and computer program instructions stored within at least one of the computer readable product configured to perform at least some of the above described method operations. In yet another embodiment, the invention pertains to an apparatus that includes one or more means for performing the above described method operations.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In general terms, the present invention provides mechanisms for avoiding problems caused by converting from a first protocol to a second protocol. One problem that may be addressed is fragmentation. Avoiding fragmentation results in a significant decrease in communication delays and a decrease in the number packets on the network. Other problems that may be avoided include dropping packets that are too large and requesting retransmission of all or part of dropped packets. In one embodiment, a protocol parameter, such as the TCP window size or maximum segment size (MSS) is modified to avoid fragmentation of data sent after modification of such protocol parameter. Modification of the protocol parameter may be based on any suitable information related to the protocol conversion process that may result in fragmentation. For example, modification may be based on an estimated or average change in data size resulting from such conversion. Additionally, modifications of the protocol parameter may be dynamically based on tracking of the actual size changes. Additionally or alternatively, modification may be based on an estimated change in data size (e.g., from adding a new header) due to tunneling between the first and second protocols.

Figure 1:
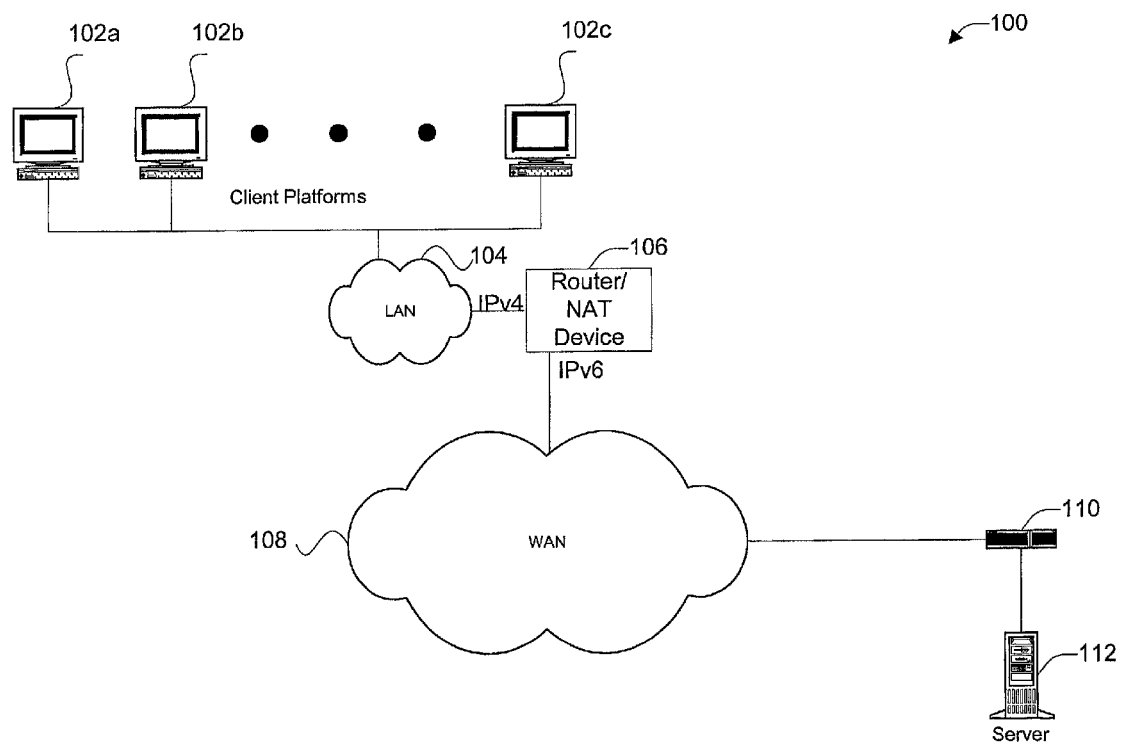
FIG. 1 is a diagrammatic representation of a computer network in which the present invention may be implemented.

FIG. 1 is a diagrammatic representation of a computer network 100 in which the present invention may be implemented. According to this specific implementation, a plurality of client machines 102 which are resident on a local area network (LAN) 104 communicate via router/NAT device 106, wide area network (WAN) 108, e.g., the Internet, and router 110 with a server 112. Of course, some or all of the clients 102 may communicate with the router/NAT device 106 through various other configurations, rather than through a LAN. For example, a client may be coupled directly to the router/NAT device 106 or there may be one or more intermediate routers between a client 102 and the router/NAT device 106. Additionally, although particular nodes are referred to as "clients" and other nodes are referred to as "servers", each node may function as a server (by responding to a data request) or a client (by making a data request).

Generally speaking, when a client platform (e.g., 102a) communicates with some remote server (e.g., 112), whether via the Internet or an intranet, it crafts a data packet which defines a TCP connection between the two hosts, i.e., the client platform and the destination server. More specifically, the data packet has headers which include the destination IP address, the destination port, the source IP address, the source port, and the protocol type. The destination IP address might be the address of a well known World Wide Web (WWW) search engine such as, for example, Yahoo, in which case, the protocol would be TCP and the destination port would be port 80, a well known port for http and the WWW. The source IP address would, of course, be the IP address for the client platform and the source port would be one of the TCP ports selected by the client. These five pieces of information define the TCP connection. Of course, any other suitable communication protocol may be utilized, besides or in addition to TCP. Although the data transmission is described in terms of the TCP and IP protocols, this is not meant to limit the scope of the invention to this specific protocol.

As shown in FIG. 1, clients 102 and LAN 104 implement IPv4 and WAN 108, router 110, and server 112 implement IPv6. In addition to routing capabilities, the router/NAT device 106 also includes mechanisms for converting from IPv4 to IPv6 and vice versa. In one embodiment, the NAT device 106 implements NAT-PT a standard IPv4 to IPv6 conversion technique. NAT-PT is described in NETWORK ADDRESS TRANSLATION—PROTOCOL TRANSLATION (NAT-PT), Request for Comments No. 2766, IETF, February 2000, which document is incorporated herein by reference in its entirety for all purposes. That is, router/NAT device 106 converts IPv4 data sent by clients 102 to server 112 to IPv6, and converts IPv6 data from server 112 to clients 102 to IPv4. Of course, the NAT mechanisms may be included within a stand alone device, rather than integrated with routing mechanisms. Additionally, the NAT mechanisms may be integrated within any suitable form of network device, such as a client, server, switch or bridge.

As described above, when data is converted from IPv4 to IPv6, the data size increases since the IPv6 addresses have a larger size than the IPv4 addresses. The resulting IPv6 header has a larger size than the IPv4 header. Additionally, when IPv4 information is contained within the payload, the payload size may also increase after conversion. The present invention provides mechanisms for modifying certain protocol parameters so that fragmentation due to such conversion is avoided. These mechanisms are preferably integrated within the router/NAT device 106 since these mechanisms may be based on the NAT results. However, these inventive mechanisms may also be implemented within a sending device (e.g., client 102) or a receiving device (e.g. server 112) if such device were made aware of the protocol conversion.

Any suitable protocol parameters may be modified to avoid fragmentation caused by converting data from one protocol to another. For example, a sending device may modify its maximum IP packet size based on anticipated increases in IP header size resulting from conversion of its data from IPv4 to IPv6. In other implementations, relevant transport layer parameters may be modified to compensate for increases in transport packet size. A relevant transport layer parameter is defined as a parameter that may be modified to avoid problems associated with a protocol translation. Examples of relevant transport parameters include the TCP/IP window size and TCP/IP maximum segment size (MSS) or corollary UDP parameters.

Figure 2:
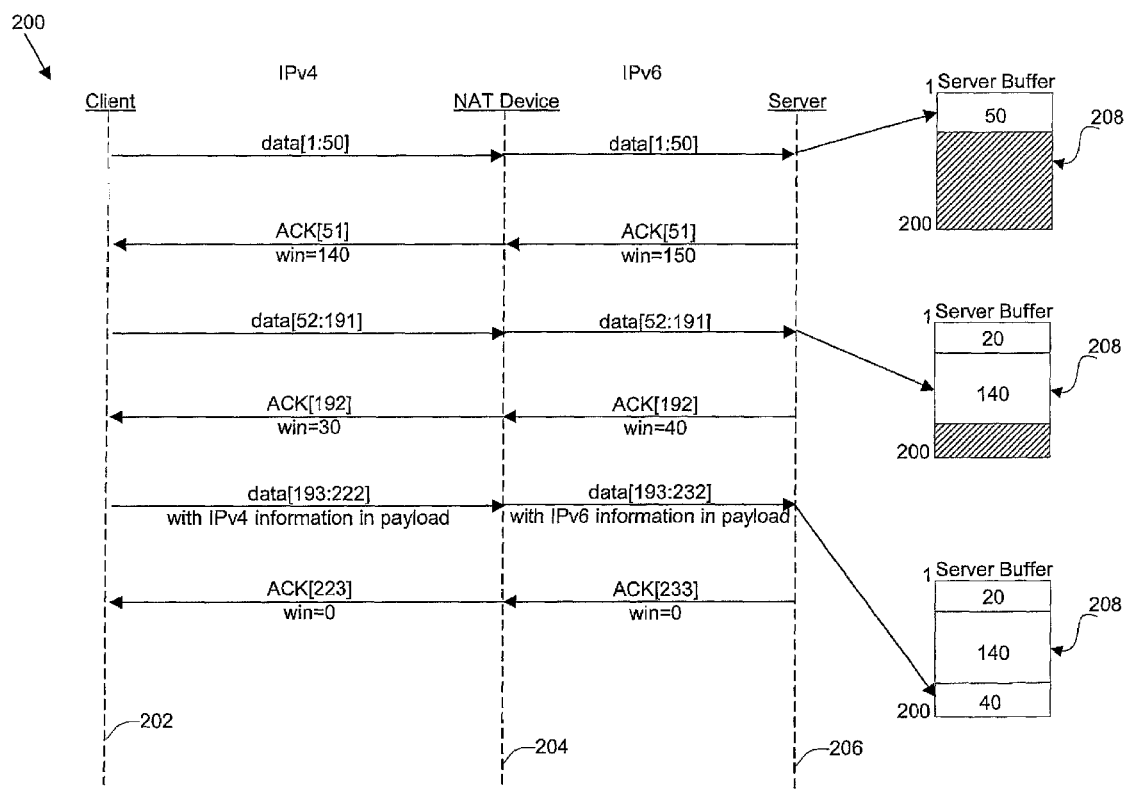
FIG. 2 is a communication diagram illustrating modification of the TCP/IP window size to avoid fragmentation or other problems caused by IPv4 to IPv6 NAT-PT conversion in accordance with one embodiment of the present invention.

FIG. 2 is a communication diagram 200 illustrating modification of the TCP/IP window size to avoid fragmentation caused by IPv4 to IPv6 NAT-PT conversion in accordance with one embodiment of the present invention. Of course, such a mechanism may also be applied to a server sending data to a client. In the communication between any of the pairs of nodes, numbers are assigned to each byte of data sent across. In FIG. 2 as well as other communication diagrams that follow FIG. 2, the first and last sequence number of the bytes in the packet are indicated. For example, data[1:50] indicates that this packet contains bytes 1 through 50. Of course, the data may grouped into other sizes, such as octets.

As shown, client 202 sends data[1:50] through NAT device 204 to server 206. In this case, the NAT device merely converts the IP header from IPv4 to IPv6 (not shown), but does not modify information in the payload. Hence, the size of data[1:50] remains 50 bytes in length. The IP and TCP headers are not shown in FIG. 2, as well as the proceeding Figures, for clarity purposes. The converted data[1:50] is received by Server 206, which stores the received 50 bytes in buffer 208. In this example, buffer 208 has a size of 200 bytes. Thus, 150 bytes of buffer space are still available. The server 206 then responds to received data[1:50] by sending an acknowledgement byte "ACK [51]" indicating a window size of 150 bytes. The window size corresponds to the amount of data that the server is willing or able to receive from client 202.

The ACK[51] is received by NAT device 204. The NAT device modifies the window size of the received ACK[51] to avoid fragmentation. The NAT device 204 then passes the ACK[51] with a modified window size to client 202. The window size may be modified to any amount that is found to avoid fragmentation. In the illustrated example, the window size is reduced by 10 bytes. Ten bytes is based on an example size increase due to protocol conversion. A more typical window size reduction is the difference (12 bytes) between the 4 byte IPv4 header and the 16 byte IPv6 header. The reduction amount may be based on experimentation. That is, different window size reductions may be implemented and it may then be determined which of these reductions do not result in fragmentation. The smallest reduction that does not result in fragmentation is preferably used. Alternatively, actual size increases caused by the protocol conversion may be tracked to determine an average size increase or worse case size increase, for example, which size increase value is used as the window size reduction value. In another implementation, the actual size increase resulting from conversion of a single set of IPv4 information in the payload is used as the reduction value. In other implementations, any number of conversions of IPv4 information within the payload may be combined and used as the reduction value.

After the client 202 receives the ACK[51] packet from the server 206, the client sends data[52:191], which meets the indicated window size of 140 bytes, through NAT device 204, to server 206. The NAT device merely changes the IP header, but not the 140 bytes of data. The server 206 stores this 140 bytes within buffer 208. Before this 140 bytes was stored, 30 bytes of the previous stored 50 bytes was processed. Hence, only 20 bytes remain from the previous buffer write. After the 140 bytes are written into buffer 208, the buffer 208 contains 160 bytes of data. Accordingly, 40 bytes of storage space remain, and the server 206 advertises a window size of 40 bytes.

The NAT device 204 changes the advertised window size of 40 bytes to 30 bytes and passes this adjusted window size to client 202. The client 202 then sends data[193:222] having a size of 30 bytes. This data has a size that corresponds to the last indicated window size. Data[193:222] contains IPv4 information within the payload. In this example, when the NAT device performs a protocol conversion, the size of the payload is increased by 10 bytes. Of course, the payload may be increased to any suitable size depending on the number and types of IPv4 information contained and converted within the payload. The NAT device 204 then sends modified data[193:232] to server 206. Note that the modified data now has a data size of 40 bytes, which is not larger than the available buffer space of 40 bytes. The server 206 writes this 40 bytes of data into buffer 208. Since the buffer 208 is now full, the server advertises a window size of zero within ACK[233] to client 202 via NAT device 204. In other embodiments, the server 206 may specify a window size of 1 byte to allow the client to perform a polling operation later to determine whether the server's buffer has available space. The NAT device 204 simply translates the IP header within ACT[233] from IPv6 to IPv4 and changes the byte number to 223, which corresponds to the next byte after the last byte received by the client.

Figure 3:
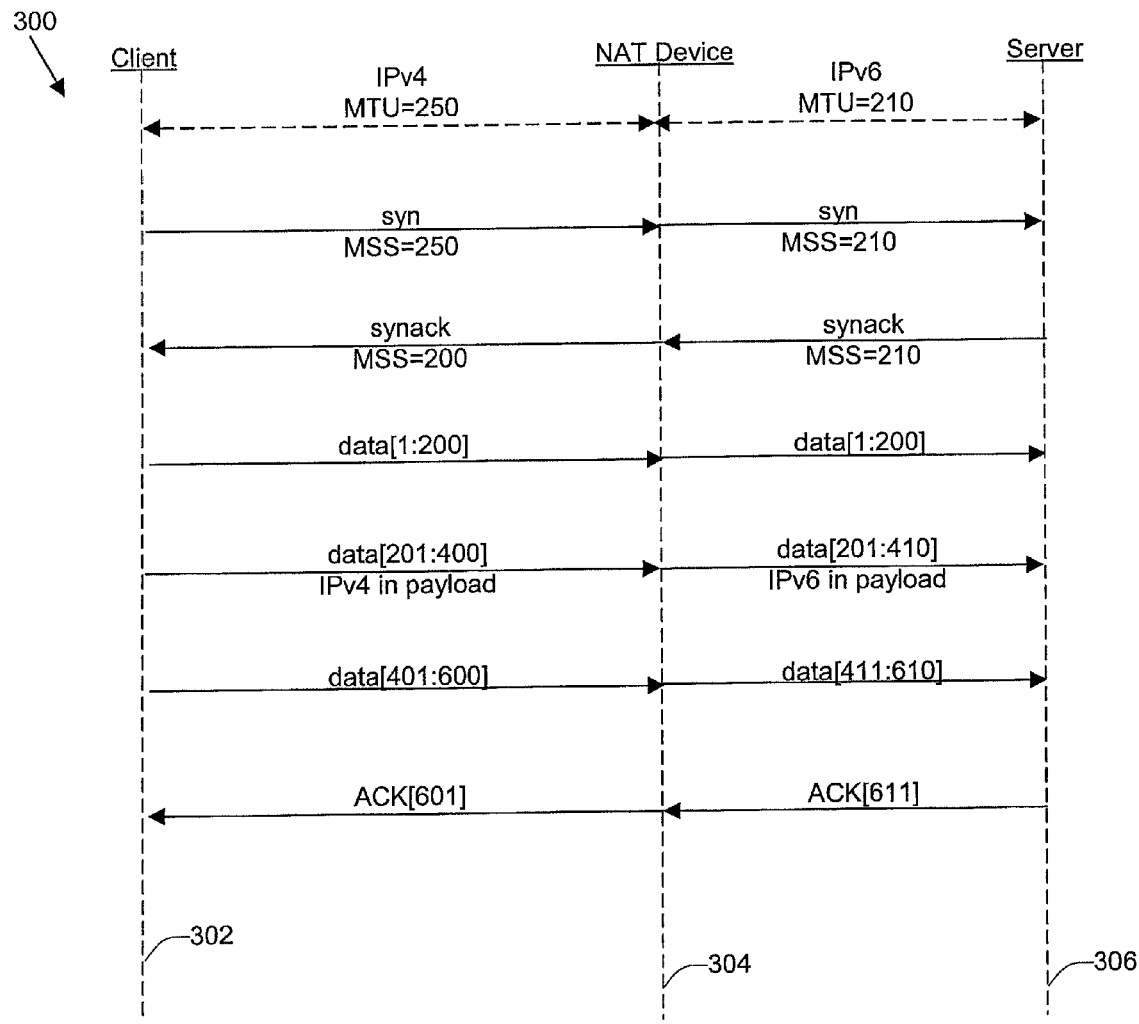
FIG. 3 is a communication diagram illustrating modification of the TCP/IP maximum segment size to avoid fragmentation caused by IPv4 to IPv6 NAT-PT conversion in accordance with an alternative embodiment of the present invention.

FIG. 3 is a communication diagram 300 illustrating modification of the TCP/IP maximum segment size (MSS) to avoid fragmentation caused by IPv4 to IPv6 NAT-PT conversion in accordance with an alternative embodiment of the present invention. As shown, the network formed by client 302 and NAT device 304 has a maximum transmission unit (MTU) of 250 bytes and implements IPv4. In contrast, the network formed between NAT device 304 and server 306 has a MTU of 210 bytes and implements IPv6. The NAT device translates all packets from the client from IPv4 to IPv6 format and all packets from the server from IPv6 to IPv4 format. At least the IP headers are translated to thereby result in a larger IP header. A translation may also result in a change in payload size if the payload contains IPv4 or IPv6 information. In the illustrated examples, a payload of a particular packet is only translated where indicated. Otherwise, merely the IP header is translated.

A particular node (e.g., client 302) may obtain its maximum segment size (MSS) in any suitable manner. For example, the client 302 may obtain its MSS through an MTU discover algorithm, currently available in Solaris 2.x from Sun Microsystems, Inc of Palo Alto, Calif. In general, discovery is accomplished by sending packets having a particular MSS, where the "don't fragment" bit is set to prevent fragmentation. Increasing MSS values are used until a packet cannot be transmitted. That is, the packet is too large to meet an MTU requirement and cannot be fragmented because the "don't fragment" bit is set. The highest value MSS that does not result in a transmission error is then used as the client's MSS.

Another technique for obtaining an MSS is accomplished by simply receiving an advertised MSS from another node. For example, the client 302 receives an MSS value from server 306. The present invention is preferably implemented in the context of this later MSS technique. Referring back to FIG. 3, client 302 initiates a connection by sending a "SYN" packet advertising an MSS equal to its outgoing interface MTU of 250. Since the NAT device 304 has an output interface with an MTU of 210, it preferably changes the MSS advertised by the client to 210 and passes the modified SYN packet to server 306. The server 306 responds by sending a "SYNACK" packet having an advertised MSS equal to its own outgoing interface MTU of 210. However, when the NAT device 304 receives this "SYNACK" packet, it reduces the MSS to 200 to account for any increase in size of a packet going from the client to the server caused by a conversion from IPv4 to IPv6. Preferably, the amount is chosen to reduce the likelihood of fragmentation due to a translation from IPv4 to IPv6. In this example, the MSS advertised by the server to the client is reduced by 10 bytes.

The client 302 then sends data[1:200] equal in size to the MSS (which in this case does not include the IP or TCP headers) modified and advertised by the NAT device 304. In the following illustrated examples, for simplicity the size of the IP and TCP headers are ignored by the sending device when calculating its own MSS based on an advertised MSS. However, the IP and TCP header sizes are typically subtracted from the advertised MSS to determine the sending devices own MSS. The NAT device 304 translates the IP header of data[1:200] to IPv6 and sends the data and translated header to server 306. The client next sends data[201:400] that has a size (i.e., 200) equal to or less than the MSS advertised by the NAT device 304. Since data[201:400] has IPv4 information within the payload, the NAT device 304 translates a portion of payload to IPv6, as well as the IP header. This translation results in a larger sized data[201:410] having a size (e.g., 210) that is equal to or less than the MSS advertised by the server 306.

Thus, converted data[201:410] still meets the MTU requirements between the NAT device 304 and server 306 so that the data[201:410] does not have to be fragmented. If the MSS advertised by the server 306 had not been reduced by the NAT device, the client may have sent too large a data packet. For instance, the client may have sent data[201:410] equal to the MSS of 210 advertised by the server. After this data is converted to IPv6, it would then have a size (i.e., 220) that failed to meet the MTU requirements between the NAT device 304 and the server 306. As a result of this discrepancy, the converted packet would have been fragmented.

Returning to FIG. 3, client then sends data[401:600] through NAT device 304 to server 306. The NAT device simply converts the IP header from IPv4 to IPv6, renumbers the data to data[411:610] and sends it to server 306. Server 306 then sends an ACK[611] packet. NAT device 304 translates the ACK[611] to IPv4 and to byte number 601. Thus, NAT device 304 sends ACK[601] to client 302. The communication continues (not shown) until a "FIN" is sent by the client to the server 306 or the connection times out, reset or abnormally terminated.

The above illustrated examples of FIGS. 2 and 3 include mechanisms for modifying a protocol parameter (e.g., the window or maximum segment size) each time a protocol parameter is advertised to a sending device whose data is to be converted from a first to a second protocol that results in a data size increase. However, a protocol parameter may be modified based on predictive information. In one implementation, it may first be determined whether an initialized connection is an FTP type connection, which has an increased first data packet size. In this example, it is determined whether the IP header of the SYN packet contains a type of service value that indicates an FTP connection. In this case, a window size communicated from the receiving device to the sending device in response to the sending device's SYN packet is reduced by the estimated increase in size of the first data packet that will be sent by the sending device. After the first data packet is sent, subsequent advertised window size's may be left unaltered or not reduced as much since it is assumed that there will be no more increases to the size of a packet payload. Alternatively, a protocol parameter may be modified as needed. For instance, when a protocol conversion results in an increase in data size, a reduced protocol parameter may be advertised to the sending node. The reduction is preferably equal to the increase in data size.

Figure 4:
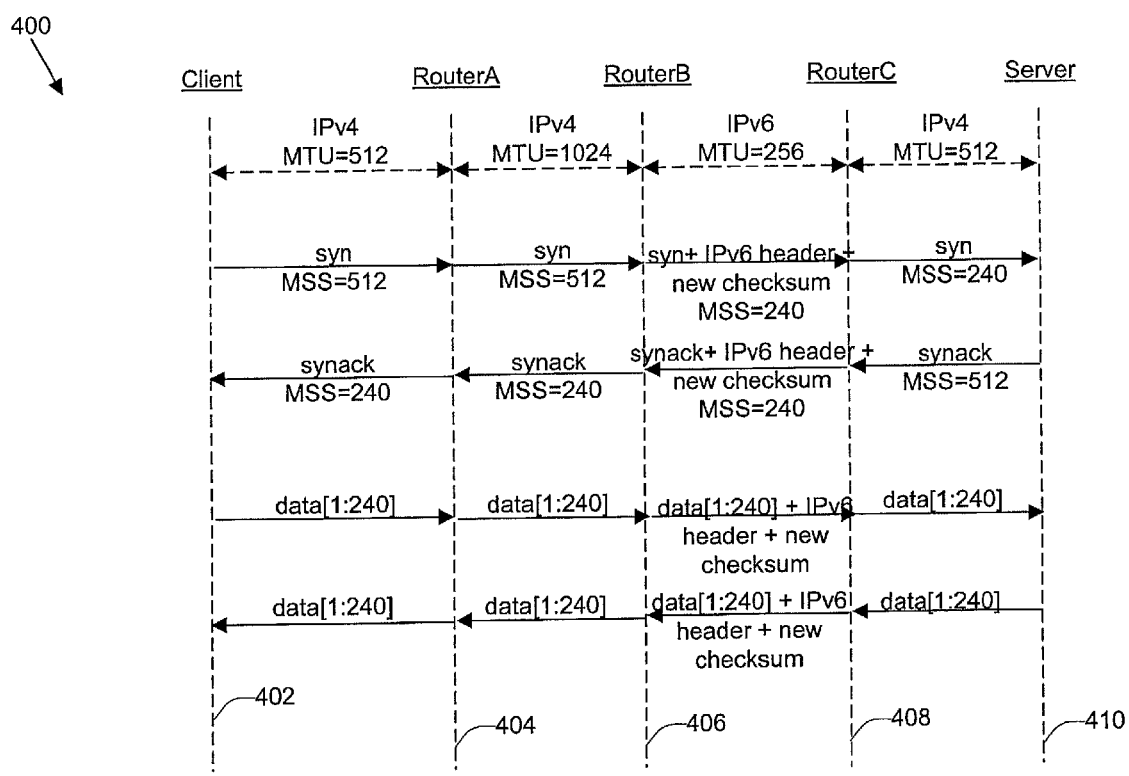
FIG. 4 illustrates a network in which techniques for avoiding fragmentation caused by tunneling between IPv4 and IPv6 occurs may be implemented in accordance with another embodiment of the present invention.

The NAT device 304 may also be configured to account for tunneling. FIG. 4 illustrates a network 400 in which techniques for avoiding fragmentation caused by tunneling between IPv4 and IPv6 may be implemented in accordance with another embodiment of the present invention. As shown, router 406 and 408 perform tunneling between IPv4 and IPv6. An MTU of 512 and IPv4 is implemented between client 402 and router 404; an MTU of 1024 and IPv4 is implemented between router 404 and router 406; an MTU of 256 and IPv6 is implemented between router 406 and router 408; and an MTU of 512 and IPv4 is implemented between router 408 and server 410.

Tunneling between router 406 and router 408 results in an IPv6 header and new checksum being added to packets going between these routers. Accordingly, router 406 or 408 may be configured to modify an MSS that is communicated to client 402 or server 404 so that fragmentation caused by tunneling is avoided. Additionally, an advertised MSS may be greater than an MTU of a particular router. Thus, a router may also be configured to reduce an advertised MSS to its own MTU value so that packets are not fragmented by such router. This later technique may also be applied without tunneling as described above with respect to FIG. 3.

As shown, client 402 sends a SYN packet with an advertised MSS of 512 which corresponds to the client's outbound interface has an MTU of 512. Router 404 receives the SYN packet and MSS of 512 and merely passes this data without modification to router 406 since the protocol remains the same and the MTU between router 404 and the next router 406 is greater than the advertised MSS from client 402. However, when router 406 receives the SYN packet, it performs tunneling on the packet since the network between router 406 and the next router 408 is IPv6 and the packet format is IPv4. That is, router 406 adds an IPv6 header and a new checksum to the SYN packet. Additionally, since router 406 is aware that tunneling is going to be performed on packets arriving from the next router 408, router 406 modifies the advertised MSS to account for tunneling performed on packets travelling between routers 406 and 408. The advertised MSS is also modified to meet the MTU requirement of 256 between routers 406 and 408. In the illustrated example, the advertised MSS 512 is reduced to 240 (512-256 MTU—16 for tunneling). Router 408 passes the modified SYN with advertised MSS of 240 to server 410. Alternatively, router 408 may be configured to modify the advertised MSS. However, preferably only one of the two routers 406 and 408 modifies the advertised MSS for packets going in a particular direction.

Likewise, when the server 410 sends a SYNACK packet with an advertised MSS of 512 (equal to its own outbound interface MTU), the router 408 modifies the advertised MSS to account for tunneling as well as the router's smaller associated MTU of 256. In this example, the advertised MSS from the server is reduced to 240. Alternatively, router 406 may be configured to modify the advertised MSS. However, preferably only one of the two routers 406 and 408 modifies the advertised MSS for packets going in a particular direction.

Thus, data moving between client 402 and server 410 may not have to be fragmented when the data is tunneled and the data goes through networks having relatively small MTU's as compared to the sending device's outbound MTU. As shown, client 402 sends data[1:240] to server 410 via routers 404, 406 and 408. The data is sized to meet the advertised MSS of 240. Router 406 performs tunneling on the data[1:240] and adds an IPv6 header and a new checksum. Since the data meets the advertised MSS and the MSS has been reduced to meet the network MTU's between the client and the server and to account for tunneling, the data[1:240], IPv6 header, and checksum meet the network MTU's between the client and the server and fragmentation is not required. Likewise, the server may transmit data[1:240] without fragmentation to client 402.

Generally, the techniques for avoiding problems caused by NAT protocol conversion of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid packet processing system of this invention is preferably implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the packet processing system (e.g., NAT device) may be implemented on a general-purpose network host machine such as a personal computer or workstation. Further, the invention may be at least partially implemented on a card (e.g., an interface card) for a network device or a general-purpose computing device.

Figure 5:
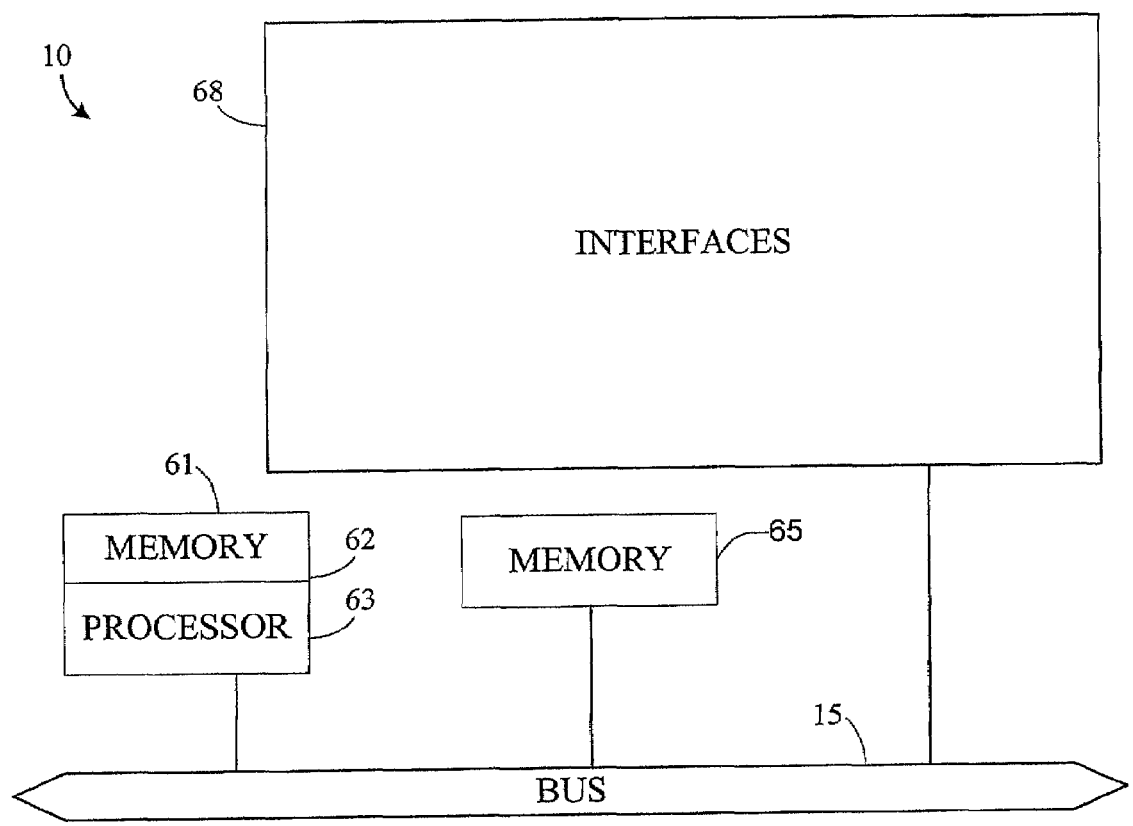
FIG. 5 is a diagrammatic representation of a router in which embodiments of the present invention may be implemented.

Referring now to FIG. 5, a router 10 suitable for implementing the present invention includes a master central processing unit (CPU) 62, interfaces 68, and a bus 15 (e.g., a PCI bus). When acting under the control of appropriate software or firmware, the CPU 62 is responsible for such router tasks as routing table computations and network management. It may also be responsible for performing protocol conversions between a first and second protocol (e.g., IPv4 and IPv6), modifying an advertised window size or MSS, etc. It preferably accomplishes all these functions under the control of software including an operating system (e.g., the Internetwork Operating System (IOS®) of Cisco Systems, Inc.) and any appropriate applications software. CPU 62 may include one or more processors 63 such as a processor from the Motorola family of microprocessors or the MIPS family of microprocessors. In an alternative embodiment, processor 63 is specially designed hardware for controlling the operations of router 10. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets or data segments over the network and sometimes support other peripherals used with the router 10. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 5 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 65) configured to store data, program instructions for the general-purpose network operations and/or the inventive techniques described herein. The program instructions may control the operation of an operating system and/or one or more applications, for example. The memory or memories may also be configured to store received packets, identifiers to track each flow and the number of such flows, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. For example, the techniques of the present invention may be applied to other conversions besides IPv4 to IPv6 conversions, such as IPv4 to IPv4 and IPv6 to IPv6 conversion or tunneling. Therefore, the described embodiments should be taken as illustrative and not restrictive, and the invention should not be limited to the details given herein but should be defined by the following claims and their full scope of equivalents.

What is claimed is:

1. A method for avoiding problems associated with protocol translation comprising:
   determining information related to converting data from a first protocol to a second protocol; and
   modifying a protocol parameter of a first data based on the determined information to thereby avoid problems associated with a second data sent after the first data, wherein problems related to change in a size of the second data may result from converting the second data from the first to the second protocol,
   wherein the protocol parameter is decreased based on the determined information and the determined information includes an estimated size increase of the second data resulting from converting the second data the first to the second protocol.

2. A method as recited in claim 1, wherein the avoided problems are selected from a group consisting of fragmentation of data, dropping of data, and retransmission of data.

3. A method as recited in claim 1, wherein the first protocol is IPv4 and the second protocol is IPv6.

4. A method as recited in claim 1, wherein the protocol parameter is related to a buffer size.

5. A method as recited in claim 4, wherein the protocol parameter is a window size.

6. A method as recited in claim 1, wherein the protocol parameter is related to a maximum data allowed in transmission.

7. A method as recited in claim 6, wherein the protocol parameter is a maximum segment size.

8. A method as recited in claim 7, wherein the maximum segment size is advertised by a sending device of the first data and the advertised maximum segment size is modified before it reaches its final destination.

9. A method as recited in claim 7, wherein modifying the maximum segment size is accomplished by performing a discovery algorithm to determine a network maximum transmission unit.

10. A method as recited in claim 1, wherein determining the information is accomplished by tracking size changes of data converted from the first to the second protocol.

11. A method as recited in claim 10, wherein determining the information is further accomplished by estimating a sizes change in data resulting from tunneling from the first to the second protocol.

12. A method as recited in claim 1, further comprising converting the first data from the first to the second protocol and the second data from the second to the first protocol.

13. A method as recited in claim 1, wherein converting data from a first protocol to a second protocol is accomplished by performing network address protocol translation (NAT-PT).

14. A method as recited in claim 1, wherein converting data from a first protocol to a second protocol is accomplished by tunneling.

15. A computer system operable to avoid one or more problems associated with protocol translation, the router comprising:
   one or more processors;
   one or more memory, wherein at least one of the processors and memory are adapted to:
   determine information related to converting data from a first protocol to a second protocol; and modify a protocol parameter of a first data based on the determined information to thereby avoid one or more problems associated with a second data sent after the first data, wherein the problem(s) are related to a change in a size of the second data that may result from converting the second data from the first to the second protocol, wherein the protocol parameter is decreased based on the determined information and the determined information includes an estimated size increase of the second data resulting from converting the second data from the first to the second protocol.

16. A computer system as recited in claim 15, wherein the avoided problems are selected from a group consisting of fragmentation of data, dropping of data, and retransmission of data.

17. A computer system as recited in claim 15, wherein the first protocol is IPv4 and the second protocol is IPv6.

18. A computer system as recited in claim 15, wherein the protocol parameter is related to a buffer size.

19. A computer system as recited in claim 18, wherein the protocol parameter is a window size.

20. A computer system as recited in claim 15, wherein the protocol parameter is related to a maximum data allowed in transmission.

21. A computer system as recited in claim 20, wherein the protocol parameter is a maximum segment size.

22. A computer system as recited in claim 21, wherein the maximum segment size is advertised by a sending device of the first data and the advertised maxim segment size is modified before it reaches its final destination.

23. A computer system as recited in claim 15, wherein determining the information is accomplished by tracking size changes of data converted from the first to the second protocol.

24. A computer system as recited in claim 15, wherein converting data from a first protocol to a second protocol is accomplished by performing network address protocol translation (NAT-PT).

25. A computer system as recited in claim 15, wherein converting data from a first protocol to a second protocol is accomplished by tunneling.

26. A computer program product for avoiding one or more problems associated with protocol translation, the computer program product comprising:
at least one computer readable medium;
computer program instructions stored within the at least one computer readable product configured to cause a combining device to:
determine information related to converting data from a first protocol to a second protocol; and
modify a protocol parameter of a first data based on the determined information to thereby avoid one or more problems associated with a second data sent after the first data, wherein the problem(s) are related to a change in a size of the second data that may result from converting the second data from the first to the second protocol,
wherein the protocol parameter is decreased based on the determined information and the determined information includes an estimated size increase of the second data resulting from converting the second data from the first to the second protocol.

27. A computer program product as recited in claim 26, wherein the avoided problems are selected from a group consisting of fragmentation of data, dropping of data, and retransmission of data.

28. A computer program product as recited in claim 26, wherein the first protocol is IPv4 and the second protocol is IPv6.

29. A computer program product as recited in claim 26 wherein the protocol parameter is related to a buffer size.

30. A computer program product as recited in claim 29, wherein the protocol parameter is a window size.

31. A computer program product as recited in claim 26, wherein the protocol parameter is related to a maximum data allowed in transmission.

32. A computer system as recited in claim 31 wherein the protocol parameter is a maximum segment size.

33. A computer program product as recited in claim 32, wherein the maximum segment size is advertised by a sending device of the first data and the advertised maximum segment size is modified before it reaches its final destination.

34. A computer program product as recited in claim 26 wherein determining the information is accomplished by track size changes of data converted from the first to the second protocol.

35. A computer program product as recited in claim 26, wherein converting data from a first protocol to a second protocol is accomplished by performing network address protocol translation (NAT-PT).

36. An apparatus for avoiding one or more problems associated with protocol translation, the apparatus comprising:
means for determining information related to converting data from a first protocol to a second protocol; and
means for modifying a protocol parameter of a first data based on the determined information to thereby avoid one or more problems of a second data sent after the first data, wherein the problem(s) are related to a change in a size of the second data that may result from converting the second data from the first to the second protocol,
wherein the protocol parameter is decreased based on the determined information and the determined information includes an estimated size increase of the second data resulting from converting the second data from the first to the second protocol.

37. An apparatus as recited in claim 36, wherein the avoided problems are selected from a group consisting of fragmentation of data, dropping of data, and retransmission of data.

38. An apparatus as recited in claim 36, wherein the first protocol is IPv4 and the second protocol is IPv6.

* * * * *

UNITED STATES PATENT AND TRADEMARK OFFICE
CERTIFICATE OF CORRECTION

PATENT NO. : 7,006,526 B1 Page 1 of 1
APPLICATION NO. : 09/920533
DATED : February 28, 2006
INVENTOR(S) : Daniel C. Biederman It is certified that error appears in the above-identified patent and that said Letters Patent is hereby corrected as shown below:

In the Claims:

In line 14 of claim 1 (column 12, line 18) change "data the" to --data from the--.

In line 3 of claim 22 (column 13, line 30) change "maxim segment" to --maximum segment--.

In line 1 of claim 32 (column 14, line 19) change "computer system" to --computer program product--.

In line 3 of claim 34 (column 14, line 28) change "track size" to --tracking size--.

Signed and Sealed this

Eighth Day of August, 2006

JON W. DUDAS
*Director of the United States Patent and Trademark Office*